United States Patent [19]

MacLeay et al.

[11] Patent Number: 4,857,596
[45] Date of Patent: Aug. 15, 1989

[54] POLYMER BOUND ANTIOXIDANT STABILIZERS

[75] Inventors: Ronald E. MacLeay; Terry N. Myers, both of Williamsville, N.Y.

[73] Assignee: Pennwalt Corporation, Philadelphia, Pa.

[21] Appl. No.: 84,537

[22] Filed: Aug. 12, 1987

[51] Int. Cl.$^4$ ............................................. C08F 8/30
[52] U.S. Cl. ................................... 525/142; 525/175; 525/194; 525/207; 525/327.5; 525/327.6; 525/329.6; 525/350; 525/351; 525/375; 525/376
[58] Field of Search ............... 525/142, 175, 194, 207, 525/327.5, 327.6, 329.6

[56] References Cited

U.S. PATENT DOCUMENTS

| | | | |
|---|---|---|---|
| 2,769,804 | 11/1956 | Hanson | 260/86.7 |
| 2,971,939 | 2/1961 | Baer | 260/45.5 |
| 2,989,517 | 6/1961 | Hanson | 260/93.5 |
| 3,336,267 | 8/1967 | Zimmerman et al. | 260/28.5 |
| 3,488,311 | 1/1970 | Burdick et al. | 260/29.6 |
| 3,509,110 | 4/1970 | DiGiulio | 260/78.5 |
| 3,522,992 | 8/1970 | Jaffe | 356/5 |
| 3,553,177 | 1/1971 | Hazen et al. | 260/78.5 |
| 3,555,001 | 1/1971 | Wallis et al. | 260/112 |
| 3,560,455 | 2/1971 | Hazen et al. | 260/78.5 |
| 3,560,456 | 2/1971 | Hazen et al. | 260/78.5 |
| 3,560,457 | 2/1971 | Hazen et al. | 260/78.5 |
| 3,632,561 | 1/1972 | Gibb et al. | 260/78.5 BB |
| 3,658,769 | 4/1972 | Kline | 260/78 UA |
| 3,723,375 | 3/1973 | Field et al. | 260/29.6 TA |
| 3,755,354 | 8/1973 | Holub et al. | 260/326 E |
| 3,767,628 | 10/1973 | Kline | 260/78 UA |
| 3,919,354 | 11/1975 | Moore et al. | 260/880 R |
| 3,956,298 | 5/1976 | Lind | 260/248 NS |
| 3,998,907 | 12/1976 | DiGiulio | 260/857 L |
| 4,066,616 | 1/1978 | Lind | 260/45.8 NT |
| 4,078,091 | 3/1978 | Dale et al. | 426/545 |
| 4,097,551 | 6/1978 | DiGiulio et al. | 260/876 B |
| 4,108,943 | 8/1978 | Lee | 260/878 R |
| 4,152,319 | 5/1979 | Kline | 260/45.9 NL |
| 4,197,370 | 4/1980 | Fox et al. | 521/77 |
| 4,238,572 | 12/1980 | Hoffman | 521/77 |
| 4,341,695 | 7/1982 | Lee et al. | 524/342 |
| 4,376,846 | 3/1983 | Kotani et al. | 525/205 |
| 4,381,373 | 4/1983 | Ikuma | 525/194 |
| 4,452,939 | 6/1984 | Parker et al. | 524/551 |
| 4,481,337 | 11/1984 | Burlett et al. | 525/340 |
| 4,486,570 | 12/1984 | Lordi et al. | 525/93 |
| 4,522,983 | 6/1985 | Le-Khac et al. | 525/285 |
| 4,785,063 | 11/1988 | Slongo et al. | 526/259 |

FOREIGN PATENT DOCUMENTS

| | | |
|---|---|---|
| 677494 | 1/1964 | Canada . |
| 1180497 | 1/1985 | Canada . |
| 76691 | 4/1983 | European Pat. Off. . |
| 0084882 | 8/1983 | European Pat. Off. . |
| 242800 | 10/1987 | European Pat. Off. . |
| 2320310 | 10/1987 | France . |
| 02714 | 2/1969 | Japan . |
| 02715 | 2/1969 | Japan . |
| 02719 | 2/1969 | Japan . |
| 24274 | 10/1969 | Japan . |
| 32054 | 12/1969 | Japan . |
| 32055 | 12/1969 | Japan . |
| 32056 | 12/1969 | Japan . |
| 26859 | 8/1971 | Japan . |
| 136782 | 11/1976 | Japan . |
| 221314 | 12/1984 | Japan . |
| 221315 | 12/1984 | Japan . |

OTHER PUBLICATIONS

J. Fertig et al., "Ultraviolet Stabilizing Monomers and Polymers," *Journal of Applied Polymer Science*, 10:663–672, (1966).
J. Herdan et al., "New Polymers with Heterocyclic Side Groups Having Antioxidant Properties," *Revue Roumaine de Chimie*, 28,7:757–762, (1983).
R. H. Kline et al., "Preparation and Activity of Polymerizable Antioxidants for Emulsion Rubbers," *Rubber Chemistry and Technology*, 46:96–105, (1973).
K. W. S. Kularatne et al., "Mechanisms of Antioxidant Action: Auto-Synergistic Antioxidants Based on Thiol Rubber Adducts," *European Polymer Journal*, 15:827–832, (1979).
G. Scott, "New Developments in Rubber–Bound Antioxidants," Rubbercon 77, Int. Rubber Conf., 1977, 1, Paper No. 19.
A. H. Weinstein, "Incorporation of Antioxidant Groups Into Polydienes," *Rubber Chemistry and Technology*, 50:641–659.
G. Scott, "Substantive Antioxidants", *Developments in Polymer Stabilization*, Publ. London, 4:181, (1981).
J. K. Kuczkowski et al., "Polymer-Bound Antioxidants", *Rubber Chemistry and Technology*, 57, pp. 621–651, (1984).

*Primary Examiner*—Joseph L. Schofer
*Assistant Examiner*—Bernard Lipman
*Attorney, Agent, or Firm*—Panitch, Schwarze, Jacobs & Nadel

[57] ABSTRACT

Polymer bound antioxidants are provided in which the antioxidant stabilizer groups are chemically bound to polymers or copolymers by an acylaminoimide or diacylhydrazide function. The polymer bound antioxidants are prepared by reacting hydrazido substituted antioxidants with some or all of the anhydride groups of anhydride containing polymers or copolymers. The concentration of the stabilizers bound to the polymer may be readily varied depending upon the particular end-use of said polymer. Polymer with high concentrations of bound antioxidants can be used as masterbatches to stabilize other polymer systems.

11 Claims, No Drawings

POLYMER BOUND ANTIOXIDANT STABILIZERS

BACKGROUND OF THE INVENTION

This invention relates to polymer bound antioxidant stabilizer compositions wherein the stabilizers are attached to anhydride polymers or copolymers by amic acid or imide formation. This invention also relates to the use of these polymer bound stabilizers to stabilize polymers or polymer blends against thermooxidative degradation.

When plastic materials are exposed to a high temperature environment either in processing or in final applications, degradation as evidenced by discoloration, cracking, and loss of mechanical properties generally occurs. To help overcome these effects a great number of heat stabilizer additives are commercially available. While most of these additives initially perform well in the plastic compositions, they tend to be removed over a period of time by vaporization, blooming (migration to the surface where they can rub off), thermal degradation, or the action of various solvents (extraction). Thus, removal of stabilizers leads to a shortened useful life of a polymer composition subjected to elevated temperatures.

Antioxidant stabilizers with low volatility are required for polymers that are extruded at high temperatures. Polycarbonate and poly(ethylene terephthalate) are processed at temperatures above 300° C. A considerable amount of additive may be lost when the hot polymers are exposed to the atmosphere or a vacuum (vented extruders) unless the additive has a very low vapor pressure. Many of the commercial low molecular weight antioxidants are too volatile to be used in these applications.

Polymers are protected against thermooxidative degradation by a variety of antioxidants which are generally classified as either chain breakers or peroxide decomposers. In most cases it is advantageous to have both types of antioxidant present. The chain breakers are stabilizers that intercept the propagation step in the oxidative degradation mechanism and thereby reduce the overall oxidation rate. Hindered phenols, secondary alkylaryl and secondary diarylamines generally fall into this category. The peroxide decomposers decompose hydroperoxides generated during the processing or aging of the polymer, through non-radical reactions thereby inhibiting the chain initiation step. Sulfides such as the well-known dialkyl thiodipropionates, aryl and alkyl phosphites, metal dithiocarbamates and dithiophosphates are among the commonly used peroxide decomposers.

Three factors affect the performance of the stabilizer in a polymer composition. The intrinsic activity of the stabilizer functional group on a molar basis, the compatibility or solubility of the stabilizer in the polymer system, and the ability of the stabilizer to remain in the polymer system. The third factor is often the dominant factor (J. K. Kuczkowski and J. G. Gillick, Rubber Chemistry and Technology, 57, pp 621–651 (1984); G. Scott, New Developments in rubber-Bound Antioxidants, Rubbercon 77, Int. Rubber Conf., 1977, 1, paper #19). Consequently, there has been a considerable amount of effort in the development of stabilizers that are less volatile, more compatible and less readily lost during fabrication and exposure to the environment. Engineering thermoplastics are processed at high temperatures so it is essential to use high molecular weight stabilizers that are not lost through drying, extrusion, and molding steps. For polymers that come in contact with foodstuffs it is important that the stabilizers are non-toxic or cannot be extracted out of the polymer into the foodstuff. Obviously, polymer bound stabilizers are preferred where FDA approval is required in the end-use.

An approach to solving the volatility and migration problems of the stabilizers has been to prepare stabilizers with polymerizable groups and then either polymerize the monomeric stabilizers to homopolymers or copolymerize the stabilizer with the monomer of the polymer requiring stabilization. (J. Fertig, A. L. Goldberg and M. Shoultchi, J. Appl. Polym. Sci., 10, pp 663–672 (1966); G. Scott, Developments in Polymer Stabilization, Vol 4, G. Scott, Ed., Appl. Sci. Pub., London, 1981, pp 181).

The more popular approach is to copolymerize the polymerizable stabilizer with another monomer. There are numerous examples of copolymerizable antioxidants found in the literature (J. K. Kuczkowski and J. G. Gillick, Rubber Chemistry and Technology, 57, pp 621–651 (1984)).

Maleimides containing N-substituted stabilizer groups of the prior art have been copolymerized with vinyl monomers to form maleimide copolymers with bound stabilizer groups. U.S. Pat. No. 4,078,091 covers homopolymers and copolymers of N-(3,5-disubstituted-4-hydroxyphenyl)maleimides. U.S. Pat. No. 4,152,319 covers copolymers prepared from the N-(3,5-disubstituted-4-hydroxyphenyl)imides of substituted maleic, itaconic and citraconic anhydrides. Japanese patent 56/139,541 A2 (CA96: 70248t) covers copolymers of N-(p-anilinophenyl)-maleimide with acrylonitrile and 1,3-butadiene. Ger. Offen. 2,025,336 (CA74: 77246y) covers copolymers of the same N-substituted maleimide with isoprene.

Other known copolymerizable N-stabilizer substituted maleimides and the references in which they can be found are as follows:

2,6-di-t-butyl-4-(N-maleimidomethyl)phenol of Canadian Patent 677,494;

N-(4-(phenylamino)phenyl)maleimide of U.S. Pat. No. 3,767,628;

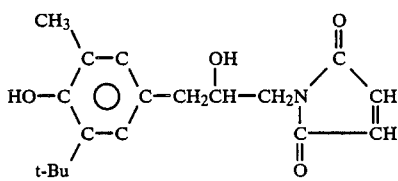

N-[2-hydroxy-3-(3-t-butyl-4-hydroxy-5-methylphenyl)-propyl]maleimide of U.S. Pat. Nos. 3,956,298 and 4,066,616.

Another method of preparing polymer bound stabilizers is to attach stabilizer groups to existing polymers or copolymers. This seems to be a more popular method of preparing polymer bound stabilizers since the stabilizer concentration can be controlled more efficiently and the stabilizer is normaly bound directly to the polymer or copolymer.

Antioxidants containing thiol groups were attached to rubber modified thermoplastics such as ABS or other rubber lattices using peroxide initiators. (K. W. S. Kularatne and G. Scott, Eur. Polym. J., 15, pp 827–32 (1979) and references cited therein).

Borg-Warner patented the method of attaching thiol antioxidants to rubber modified thermoplastics in the presence of a peroxide initiator in a melt processing step (European Patent Application 84,882).

A. H. Weinstein incorporated antioxidant groups containing thiol or disulfide groups into polydiene homo- or copolymers by chain transfer methods during the polymerization or by free radical addition to the olefinic units after polymerization. (A. H. Weinstein, Rubber Chemistry and Technology, 50, pp 641–659 (1977)).

The introduction of antioxidant functions into polydienes during post polymerization interactions of amino, hydroxyl or nitroso substituted antioxidants with epoxy, olefin or carbonyl groups present in the polydiene substrate has been reviewed by Kline and Miller (R. H. Kline, J. P. Miller, Rubber Chemistry and Technology, 46, pp 96–104 (1973)).

N-(2-hydroxyethyl)-S-(2-benzothiazolyl)mercaptoacetamide and N-(2-hydroxyethyl-S-(2-benzimidazolyl(mercaptoacetamide have been reacted with cetyl methacrylate-maleic anhydride copolymer to obtain the corresponding polymer (semiester) bound antioxidants (J. Herdan, L. Crisan, M. Luca, S. Balin, Rev. Roun. Chim., 1983, 28(7), pp 757–762; CA100: 86205p). However such semiester linkages are far less thermally stable than the imide linkages of the present invention. Polymeric semiesters are known to be unstable at temperatures used to process thermoplastic compositions and have been used as blowing agents for such compositions (U.S. Pat. No. 4,238,572: Ger. Offen. 2,757,558: CA89: 111460).

There has been a considerable amount of activity in the area of preparing polymer bound stabilizers by modifying copolymers containing reactive functionalities with stabilizers containing groups that react with the reactive functionality of the copolymer. Examples of such modifications include: modification of methacrylic acid/styrene copolymers with stabilizers containing glycidyl groups (Japanese Patents 69/32,054, 69/32,055 and 69/32,056: CA72: 67742, 67743 and 67744), transesterification of ethylene-vinylacetate with esters of beta-(3,5-di-t-butyl-4-hydroxyphenyl)propionic acid (Japanese Patent 76/136,782; CA86; 107573), modification of glycidyl (meth)acrylate copolymers with reactive stabilizers (Japanese Patent 69/24,274; CA72: 80236f), modification of vinyl-p-benzyl chloride-polybutadiene copolymers with thiol-containing antioxidants (U.S. Pat. Nos. 4,481,337 and 4,452,939) and modification of carboxy-containing polyolefins with stabilizers containing glycidyl groups (Japanese Patents 69/02,714, 69/02,715 and 69/02,719; CA70: 107161a, 107162b, 107152y).

Japanese Patent 71/26,859 (CA77: 20858d) covers the attachment of antioxidants containing amino groups, hydroxyl groups or isocyanate groups to crosslinked glycidyl methacrylate-divinylbenzene copolymers or crosslinked styrene-maleic anhydride-divinylbenzene copolymers.

None of these prior art references discloses the present invention.

SUMMARY OF THE INVENTION

This invention is directed to a polymer with recurring units selected from

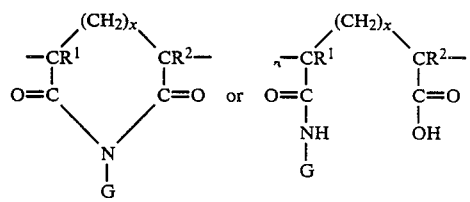

or both in which the units occur either in the polymer backbone or as pendant units or both.

$R^1$ and $R^2$ are independently selected from hydrogen, alkyl of 1 to 6 carbons, cycloalkyl of 5 to 7 carbons, phenyl, chlorine or bromine, and x is 0 or 1.

represents the residue of a hydrazido substituted antioxidant stabilizer group bound to the polymer or copolymer and selected from (a) hindered phenols, (b) sulfides, (c) aromatic amines, or (d) heterocyclic stabilizer.

DETAILED DESCRIPTION OF THE INVENTION

In accordance with the invention there is provided a novel class of polymers containing pendant antioxidant stabilizer groups which are prepared from:

(a) cyclic anhydride containing polymers or copolymers and antioxidant compounds containing hydrazide functionality or (b) the copolymerization of ethylenic or vinyl aromatic monomers with N-substituted imides (or N-substituted amic acids) of cyclic alpha, beta-unsaturated dicarboxylic acid anhydrides where the N-substituents contain stabilizing groups. Preferably, the cyclic anhydride containing polymer or copolymer is a copolymer of maleic anhydride. The polymer bound stabilizer groups are attached as pendant N-substitutents on the imide group of the copolymer or as N-substitutents or intermediate amic acids which are capable of cyclizing to the imide group upon heating above 200° C. The compositions are useful as heat stabilizers for polyolefins, (rubber modified) styrenics and engineering thermoplastics such as poly(phenylene oxide), poly(phenylene ether), polycarbonate and poly blends of these materials.

Only one class of antioxidant can be present in the stabilizer composition; however, multiple combinations of stabilizers within the same class are also defined by this invention. The different antioxidant classes ($G_1$ to $G_4$) are described by the following general structures.

(a) Hindered phenols of general structure:

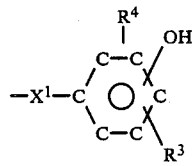

wherein $R^3$ is t-alkyl of 4 to 8 carbons. $R^4$ is hydrogen, t-alkyl of 4 to 8 carbons or alkyl of 1 to 8 carbons. $X^1$ is a divalent connecting radical selected from —N(R)—C(=O)—(CH$_2$)$_b$—C(=O)—NH—,
—N(R)—C(=O)—(CH$_2$)$_b$—,
—N(R)—C(=O)—(CH$_2$)$_b$—S—CH$_2$,
—N(R)—C(=O)—O—(CH$_2$)$_b$—,
—N(R)—C(=O)—(CH$_2$)$_b$—Z—, or
—N(R)—C(=O)—C(CH$_3$)$_2$—, in which b is 0, 1 or 2. Z is selected from —NH—, —S—, or —O—, and R is hydrogen, primary or secondary alkyl of 1 to 8 carbons, aralkyl of 7 to 12 carbons or cycloalkyl of 5 to 12 carbons.

Preferably, the hydroxy group is in the 4 position $R^3$ is a t-butyl or t-amyl group in the 3 position and $R^4$ is a t-butyl or t-amyl group in the 5 position of the phenyl ring, and $X^1$ is —N(R)—C(=O)—(CH$_2$)$_b$—C(=O)—NH—, —N(R)—C(=O)—(CH$_2$)$_b$—, —N(R)—C(=O)—(CH$_2$)$_b$—S—CH$_2$— or —N(R)—C(=O)—(CH$_2$)$_b$—Z— where R is hydrogen, Z is —NH— and b is as previously defined. Most preferably, $X^1$ is —N(R)—C(=O)—C(=O)—NH—, —N(R)—C(=O)—(CH$_2$)$_b$— or
—N(R)—C(=O)—(CH$_2$)$_b$—S—CH$_2$—, and b is 1 or 2.

(b) Sulfides of general structure:

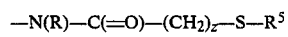

wherein
R is as previously defined.
$R^5$ is aralkyl of 7 to 12 carbons, alkyl of 1 to 18 carbons, or dialkylaminoalkyl of 3–12 carbons, and z is 1 or 2.

Preferably, R is hydrogen, $R^5$ is an alkyl of 6 to 18 carbons, benzyl, or dimethylaminoethyl and z is 2. Most preferably, $R^5$ is alkyl of 6 to 12 carbons.

(c) Aromatic amines of general structure:

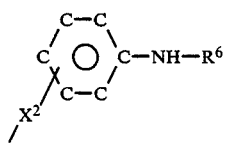

where $R^6$ is aryl of 6 to 14 carbons, alkyl of 1 to 12 carbons or cycloalkyl of 5 to 12 carbons. $X^2$ is a divalent connecting radical selected from
—N(R)—C(=O)—C(CH$_2$)$_b$—C(=O)—NH— or
—N(R)—C(=O)—(CH$_2$)$_b$—NH—
where R and b are as previously defined.

Preferably, R is hydrogen, $R^6$ is aryl of 6 to 10 carbons or alkyl of 1 to 12 carbons, $X^2$ is —N(R)—C(=O)—(CH$_2$)$_b$—C(=O)—NH—, and b is 0, 1, or 2. Most preferably, $R^6$ is aryl of 6 to 10 carbons and the substitution of the connecting group is in the 4 position, and b is 0.

(d) Heterocyclic stabilizers of general structure:

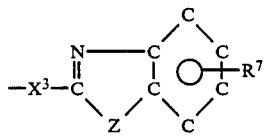

where $R^7$ is hydrogen or alkyl of 1 to 4 carbons; Z is as previously defined; $X^3$ is a divalent connecting radical selected from
—N(R)—C(=O)—(CH$_2$)$_z$—Z—,
—N(R)—C(=O)—(CH$_2$)$_b$—C(=O)—NH—,
—N(R)—C(=O)—(CH$_2$)$_b$—NH—, or
—N(R)—C(=O)—NH— in which R, z, and b are as previously defined.

Preferably, R is hydrogen, $R^7$ is hydrogen or methyl, $X^3$ is —N(R)—C(=O)—(CH$_2$)$_z$—Z— where Z is —S— or —NH— and z is one or 2. Most preferably, $R^7$ is hydrogen, $X^3$ is —N(R)—C(=O)—(CH$_2$)$_z$—Z— where Z is —S— and z is one.

Stabilizer groups which are attached to anhydride polymers and copolymers through an N-(acylamino)imide linkage (i.e., by reaction of a hydrazide group with the anhydride group to form the cyclic imide) are particularly advantageous. The diacyl hydrazide function is known to be a useful antioxidant which deactivates detrimental metal residues by chelation (U.S. Pat. Nos. 4,147,689, 4,465,571, and 3,887,518). N-(acylamino)imides are known stabilizers of polyolefins against the thermooxidative degradation caused by the catalytic action of heavy metals (U.S. Pat. No. 3,956,331).

It is therefore desirable that at least some of the attached antioxidant be bound to the polymer by such N-(acylamino)imide connecting groups (as described in the examples).

STARTING MATERIALS

The polymer bound stabilizers of this invention are prepared from anhydride polymers or copolymers by reacting antioxidants bearing reactive hydrazido functionalities with the anhydride polymers or copolymers. In this reaction, the stabilizer becomes attached to the polymer or copolymer in the form of a substituted amide group, or a substituted imide group. In the preferred embodiment of this invention, the stabilizer group becomes part of an acylamino group bound to a cyclic imide which is part of the polymer or copolymer.

FUNCTIONALIZED HINDERED PHENOL ANTIOXIDANTS

The compounds of this invention may be prepared by reacting suitably functionalized hindered phenol antioxidants with anhydride containing polymers or copolymers. Examples of hindered phenols which may be reacted with the anhydride polymers or copolymers include the following:
3-(3,5-di-t-butyl-4-hydroxyphenyl)propionhydrazide,
3-(3,5-di-t-amyl-4-hydroxyphenyl)propionhydrazide,
3-(3-t-butyl-5-methyl-4-hydroxyphenyl)propionhydrazide,
3-(3-t-butyl-4-hydroxyphenyl)propionhydrazide,
3-(3,5-di-t-hexyl-4-hydroxyphenyl)propionhydrazide,
3,5-di-t-butyl-4-hydroxybenzhydrazide,
3,5-di-t-amyl-4-hydroxybenzhydrazide,
3-t-butyl-5-methyl-4-hydroxybenzhydrazide,
4-(3,5-di-t-butyl-4-hydroxyphenyl)semicarbazide,
1-methyl-2-(3,5-di-t-butyl-4-hydroxyphenyl)propionhydrazide,
(3,5-di-t-butyl-4-hydroxyphenyl)acetylhydrazide,
N-(3,5-di-t-butyl-4-hydroxyphenyl)-N'-aminooxamide,
2,5-di-t-butyl-4-hydroxyphenylcarbazate,
3,5-di-t-butyl-4-hydroxybenzylcarbazate,
(3,5-di-t-butyl-4-hydroxyphenylmercapto)acetylhydrazide,
(3-t-butyl-5-methyl-4-hydroxyphenylmercapto)acetylhydrazide,
3-(3,5-di-t-butyl-4-hydroxyphenylmercapto)propionhydrazide,
3-(3-t-butyl-5-methyl-4-hydroxyphenylmercapto)propionhydrazide,
(3,5-di-t-butyl-4-hydroxybenzylmercapto)acetylhydrazide,
(3-t-butyl-5-methyl-4-hydroxybenzylmercapto)acetylhydrazide,
3-(3,5-di-t-butyl-4-hydroxybenzylmercapto)propionhydrazide,
3-(3-t-butyl-5-methyl-4-hydroxybenzylmercapto)propionhydrazide.

FUNCTIONALIZED SULFIDE ANTIOXIDANTS

The compounds of this invention may be prepared by reacting suitably functionalized sulfide antioxidants with anhydride containing polymers or copolymers. Sulfides which may be reacted with the anhydride polymers or copolymers include the following non-exclusive examples:
3-(methylmercapto)propionhydrazide,
3-(ethylmercapto)propionhydrazide,
3-(butylmercapto)propionhydrazide,
3-(n-hexylmercapto)propionhydrazide,
3-(n-octylmercapto)propionhydrazide,
3-(decylmercapto)propionhydrazide,
3-(dodecylmercapto)propionhydrazide,
3-(stearylmercapto)propionhydrazide,
3-(benzylmercapto)propionhydrazide,
(methylmercapto)acetylhydrazide,
(ethylmercapto)acetylhydrazide,
(benzylmercapto)acetylhydrazide,
(2-(dimethylamino)ethylmercapto)acetylhydrazide,

FUNCTIONALIZED AROMATIC AMINE STABILIZERS

The compounds of this invention may be prepared by reacting suitably functionalized aromatic amines with anhydride containing polymers or copolymers. Secondary aromatic amines which may be reacted with the anhydride polymers or copolymers include the following non-exclusive examples:
N-p-anilinophenyl oxamic acid hydrazide and
N-p-anilinophenyl succinamic acid hydrazide.

FUNCTIONALIZED HETEROCYCLIC STABILIZERS

The compounds of this invention may be prepared by reacting suitably functionalized heterocyclic stabilizers having known antioxidant properties with anhydride containing polymers or copolymers. Benzothiazoles and benzimidazoles which may be reacted with anhydride polymers or copolymers include the following non-exclusive examples:
(benzothiazol-2-yl-mercapto)acetylhydrazide, and
(benzimidazol-2-yl-mercapto)acetylhydrazide.

ANHYDRIDE CONTAINING POLYMERS AND COPOLYMERS

In general, any polymer or copolymer containing cyclic anhydride groups, either on the polymer backbone or grafted side chains, is suitable for attachment of the reactive stabilizers to form the polymer bound stabilizers of this invention. Due to cost and ease of preparation the anhydride containing polymers are preferably polymers or copolymers of maleic anhydride.

Suitable anhydride containing copolymers useful for employment in this invention include the following: (a) styrene-maleic anhydride copolymers, (b) alternating copolymers of maleic anhydride and alpha olefins, (c) copolymers of alkyl vinyl ethers and maleic anhydride, (d) maleic anhydride modified polyolefins, (e) anhydride adducts of hydrogenated polymers or copolymers, (f) maleic anhydride adducts of EPDM, and (g) other anhydride copolymers.

(a) Styrene-maleic anhydride copolymers

These copolymers are a general class of compounds of alternating copolymers of styrene and maleic anhydride, or the non-equimolar copolymers containing less than about 50 mole percent of the anhydride monomer. The styrene may be replaced in whole or in part by other vinylaromatic monomers such s alpha-methylstyrene, nuclear methylstyrenes, ethylstyrene, isopropylstyrene, t-butylstyrene, chlorostyrenes, dichlorostyrenes, bromostyrenes, dibromostyrenes, vinylnaphthalene, and the like. Similarly, the maleic anhydride can be replaced in whole or in part by another alpha, beta-unsaturated cyclic dicarboxylic acid anhydride such as itaconic, aconitic, citraconic, mesaconic, chloromaleic, bromomaleic, dichloromaleic, dibromomaleic, phenylmaleic and the like. The preferred alpha, beta-unsaturated cyclic anhydride is maleic anhydride. The copolymer may also contain a termonomer such as a 1-3 carbon alkyl acrylate or methacrylate, acrylonitrile, methacrylonitrile, acrylamide, methacrylamide, acrylic acid, or methacrylic acid.

Suitable copolymers may be prepared by any of the several methods available for the preparation of styrene-maleic anhydride copolymers or they may be purchased commercially. Non-equimolar copolymers may be prepared by solution polymerization directly from the respective monomers by the incremental addition of the reactive monomer as taught by U.S. Pat. No. 2,791,939, by a continuous recycle polymerization process such as described in U.S. Pat. Nos. 2,769,804 and 2,989,517, by the suspension polymerization process described in U.S. Pat. No. 3,509,110, or by numerous known variations.

Also suitable are the rubber-modified copolymers where 5 to 40 percent by weight of one of the known elastomers have been incorporated into the vinylaromatic alpha, beta-unsaturated dicarboxylic acid anhydride copolymer. The elastomers may be incorporated into the anhydride copolymers by blending, mixing or copolymerizing the monomers in the presence of the rubber.

Suitable rubbers, or elastomers, include conjugated 1,3-diene rubbers, styrene-diene copolymer rubbers, acrylonitrile-diene copolymer rubbers, ethylene-propylene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene substituted styrenes, acrylonitrile, methacrylonitrile and isobutylene.

Preferably, the elastomers are incorporated into the monomer mixture prior to polymerization using, for examples, the method of U.S. Pat. No. 4,097,551 or U.S. Pat. No. 4,486,570 in which a mixture of at least two rubbery additives are present during the polymerization.

Particularly suitable for use are the non-equimolar copolymers of styrene and maleic anhydride designated Dylark TM copolymers (commercially available from ARCO Chemical Company). Suitable Dylark copolymers include those of the 200 series and the 300 series and Dylark TM 600 and 700. The copolymers designated Dylark TM 250, Dylark TM 350 and Dylark TM 700 are impact modified.

The SMA TM resins are low molecular weight styrene-maleic anhydride copolymers (MW 700–1900) and are also useful in this invention. The low molecular weight resins SMA TM 1000, 2000 and 3000 available from ARCO are also useful in this invention.

Also suitable are the styrene-maleic anhydride copolymers or rubber modified styrene-maleic anhydride copolymers where a portion of the anhydride groups are converted to imide groups or N-substituted imide groups. The partially imidated copolymers can be prepared by treating the SMA polymer with a primary amine in a post polymerization step as described in U.S. Pat. No. 3,998,907 or during the polymerization as described in U.S. Pat. No. 4,381,373. The molar ratio of the amine to the anhydride in the copolymer should be less than 0.8 to allow attachment of the stabilizer groups. The formation of the imide groups that don't contain stabilizers may be formed before, during, or after the formation of the imide groups containing stabilizer groups. Suitable amines for this purpose are ammonia, primary alkyl amines, and primary aryl amines. Long chain primary alkyl amines will beneficially aid in flow properties of the polymer while primary aryl amines will increase the thermal stability and heat distortion properties of the system. Aniline is the preferred aromatic amine for increasing the thermal stability of the polymer system. Brominated or chlorinated primary amines will increase the fire retardancy of the system.

The SMA copolymer may optionally contain a termonomer such as a 1–3 carbon alkyl acrylate or methacrylate, acrylonitrile, methacrylonitrile, acrylamide, methacrylamide, acrylic acid or methacrylic acid. Rubber modified terpolymers of styrene, maleic anhydride and lower alkyl (1–3 carbons) methacrylates are described in U.S. Pat. No. 4,341,695. Incorporation of the methacrylate comonomer at specific levels (2 to 20% by weight) increases the heat distortion temperature of the polymer, raises the tensile strength and increases the gloss of the rubber-modified polymer. The polymeric composition is conveniently prepared by dissolving the rubber in a solution of the monoalkenyl aromatic component and the methacrylate ester in a suitable solvent and then polymerizing the solution with the anhydride component in the manner described in, for example, U.S. Pat. Nos. 2,971,939, 3,336,267, and 3,919,354.

The Cadon TM resins (Monsanto Chemical Company) are a commercial series of styrene-maleic anhydride polymer alloys with ABS. Rubber modified versions are also available. These resins are also suitable for this invention.

Also suitable are the rubber modified styrene-maleic anhydride resins described in U.S. Pat. No. 4,522,983 where a minor amount of a nuclear substituted methylstyrene is included in the composition to increase the impact strength of the composition.

The styrene-maleic anhydride polymers may be further modified by copolymerizing the monomers in the presence of other monomers. In addition to the acrylates, methacrylates, acrylonitrile and methacrylonitrile previously mentioned, other suitable monomers include the ethlenically unsaturated carboxylic acids, preferably, acrylic and methacrylic acids, acrylamide and methacrylamide, dialkylamino alkyl acrylates of 6–18 carbons or methacrylates such as dimethylaminoethyl acrylate or methacrylate, and vinyl esters derived from saturated carboxylic acids of 2 to 22 carbons such as vinyl acetate or vinyl propionate.

Further modification of the styrene-maleic anhydride copolymers can be accomplished by carrying out the copolymerization in the presence of crosslinking monomers having two or more ethylenically unsaturated double bonds such as divinylbenzene, 1,4-butadiene, divinyl ether, ethylene glycol dimethacrylate, butanediol dimethacrylate, triallyl cyanurate and similar type compounds. The crosslinking monomers are employed in amounts of from 0.01 to 5, preferably, from 0.1 to 2 mole percent based on maleic anhydride.

(b) Copolymers of maleic anhydride and alpha-olefins

These types of copolymers are exemplified by U.S. Pat. Nos. 3,553,177, 3,560,455, 3,560,456 and 3,560,457. Each of these patents describes a copolymer of maleic anhydride with a specific alpha-olefin such as a 12–30 carbon alpha-olefin. The copolymers of 6–10 carbon alpha-olefins are known as shown by U.S. Pat. No. 3,488,311. Terpolymers of maleic anhydride and at least one lower alpha-olefin and at least one higher alph-olefin are exemplified by Canadian Pat. No. 1,180,497.

The alternating copolymers may be prepared by conventional polymerization processes including those described in U.S. Pat. Nos. 3,553,177, 3,560,455, 3,560,456, 3,560,457 and 3,488,311. PA-18 is an example of a commercially available alternating copolymer of maleic anhydride and octadecene-1 (product of the Chevron Chemical Company).

Also suitable for this invention are the terpolymers disclosed in U.S. Pat. Nos. 4,522,992 and 3,723,375. These are basically terpolymers of cyclic alpha, beta-unsaturated dicarboxylic acid anhydrides, aromatic-mono-alkenyl monomers and higher 1-alkenes. Preferably they are terpolymers of styrene, maleic anhydride and alpha-olefins having 10 or more carbons. Both pure alkenes and mixed alkenes can be utilized in preparing the terpolymers.

(c) Copolymers of alkyl vinyl ethers and maleic anhydride

These copolymers are readily prepared in bulk or solution using free radical initiators (e.g., lauroyl peroxide) (British Pat. No. 1,117,515). Low, medium and high molecular weight grades are commercially available. Commercial grades include the Gantrez ™ resins (General Aniline and Film). Suitable alkyl vinyl ethers for copolymerization include methyl, ethyl, propyl, isopropyl, n-butyl, isobutyl, amyl, isoamyl, hexyl, heptyl, octyl, 2-ethylhexyl, nonyl, decyl, dodecyl, hexadecyl, and octadecyl vinyl ethers.

(d) Maleic anhydride modified polyolefins

These copolymers useful in the present invention have the general formula:

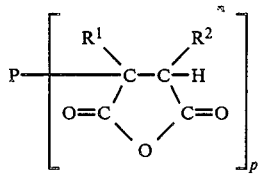

where P represents an olefin polymer residue which is based on a preponderance of ethylene, propylene or 1-butene, and having a valence of p. It can be either a high or low density polyethylene residue, a polypropylene residue or a residue of a copolymer of ethylene with 1-butene, a residue of a copolymer of ethylene and propylene, a residue of a propylene butene copolymer or a residue of such a propylene copolymer with an olefin having up to about six carbons.

The maleic anhydride-modified polyolefins contain about 0.2 to 9% by weight of combined maleic anhydride, preferably, about 2 to 5%. In fact, one embodiment of these materials is a commercially available product, sold under the trademark "Hercoprime ™" by Hercules Incorporated. Polyethylene or polypropylene modified with maleic anhydride is available commercially from Enron Chemical Co. under the trademark "Plexar ™". Any polymer or copolymer of ethylene, propylene, or 1-butene can be modified via the maleic anhydride moeity to form the substrate molecule, including polyethylene, polypropylene, ethylene-propylene copolymer, propylene-butene-1 copolymer, or butene-1-ethylene copolymer. The most frequently encountered and the preferred maleic anhydride modified polyolefin is that based on polypropylene.

The olefin polymer based imides of the invention are prepared by graft modifying the appropriate polymer backbone with a maleic anhydride and thereafter reacting said anhydride modified olefin polymer with stabilizers containing hydrazide functionality. A less preferred method is to modify the appropriate polymer backbone with N-(stabilizer substituted)maleimides of formula:

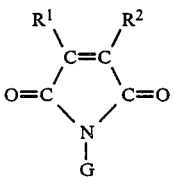

where R$^1$, R$^2$, and G are as previously defined.

(e) Maleic anhydride adducts of hydrogenated polymers or copolymers

The maleic anhydride adduct polymers useful in this invention are polymeric products containing pendant succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from 0.5 to 20 percent of their original unsaturation level prior to hydrogenation. The reaction which is conducted by heating a mixture of the maleic anhydride and hydrogenated polymer or copolymer containing residual unsaturation proceeds by means of a reaction mechanism referred to as an "ENE" type reaction. The maleic anhydride adds to the unsaturation of the polymer to form the polymer product containing the pendant succinic anhydride groups. This polymer by virtue of the pendant anhydride groups can be reacted with stabilizers containing hydrazide groups to form the polymer bound stabilizers of this invention.

The amounts of maleic anhydride employed in the reaction can vary considerably depending on the specific nature of the hydrogenated polymer and the properties desired in the final product. In general, the amount of maleic anhydride employed may range from 0.1 to about 25 percent by weight based on total weight of maleic anhydride and hydrogenated polymer with a preferred amount being from 0.2 to 5 percent by weight.

Various polymers of conjugated dienes and copolymers of conjugated dienes and vinyl aromatic hydrocarbons may be hydrogenated for use in preparing the maleic anhydride adduct component of the compositions of the invention. Polymers of conjugated dienes which may be hydrogenated include polymers derived from one or more conjugated diene monomers. Thus, polymers derived from a single conjugated diene such as 1,3-butadiene (i.e., a homopolymer) or polymers derived from two or more conjugated dienes such as, for example, 1,3-butadiene and isoprene or 1,3-butadiene and 1,3-pentadiene (i.e., a copolymer) and the like may be utilized. Copolymers which may be hydrogenated include random copolymers of conjugated dienes and vinyl aromatic hydrocarbons and block copolymers of conjugated dienes and vinyl aromatic hydrocarbons which exhibit elastomeric properties.

(f) Maleic anhydride adducts of EPDM

These copolymers are prepared by the thermal addition of maleic anhydride to elastomeric copolymers of ethylene and propylene which have a substantially saturated hydrocarbon backbone chain and unsaturated hydrocarbon side-chains.

(g) Other anhydride copolymers

Examples of other anhydride copolymers include the following:
(1) vinyl acetate-maleic anhydride copolymer (2) ethylene-vinyl acetate-maleic anhydride terpolymer, (3) isobutylene-maleic anhydride copolymers
(4) graft polyols containing styrene-maleic anhydride copolymer in the grafted chain,
(5) styrene-maleic anhydride-2,4,5-tribromophenyl acrylate terpolymer,
(6) maleic anhydride-divinylbenzene-styrene terpolymer,
(7) ethylene-maleic anhydride-styrene graft copolymer,
(8) methyl methacrylate-maleic anhydride copolymers,
(9) butyl methacrylate-maleic anhydride-styrene copolymer, and
(10) ethylene-maleic anhydride copolymers.

Other suitable maleic anhydride copolymers include the terpolymers of anhydrides, aromatic mono-alkenyl monomers and higher 1-alkenes described in U.S. Pat. No. 4,522,992; and tribromophenyl acrylate-epichlorohydrin-maleic anhydride-styrene copolymer described in U.S. Pat. No. 4,108,943; and the methyl methacrylate-maleic anhydride styrene copolymers disclosed in Japanese Pat. Nos. 59/221,314 and 59/221,315 (CA102: 150317x and 150318y); and divinyl ether-maleic anhydride copolymers from Adica Labs (Pivan); and a polybutadiene-polystyrene-maleic anhydride terpolymer referred to as Ricon TM 184/MA (a product of Colorado Chemical Specialities, Inc.); and ethylene/vinyl acetate copolymer grafted with maleic anhydride such as Modic E 310 K (a product of Mitsubishi Chemical Industries Co.).

In addition poly(maleic anhydride) such as Belcene, a product of Ciba-Geigy, is also suitable in this invention.

Anhydride polymers containing glutaric anhydride units can also be used in this invention. Such polymeric anhydrides are available from polymers and copolymers of acrylic and methacrylic acid by heating under dehydrating conditions, with or without a catalyst (European Pat. No. 76,691),

Synthesis

This invention is based on the reaction of an anhydride with a hydrazide to yield a diacyl hydrazide and a carboxylic acid. Cyclic anhydrides and hydrazides react to form a product which contains both diacyl hydrazide and carboxylic acid functional groups. In this instance, the diacyl hydrazide can be called an N-(acylamino)amide; and thus the product is both an amide and carboxylic acid and is called an amic acid. If such an amic acid is heated, further reaction occurs in which a molecule of water is lost and a ring is formed with two carbonyl groups attached to the amide nitrogen. This product is called an imide or from a hydrazide, more accurately an N-(acylamino)imide.

Depending upon the substitution of the anhydride the formation of amic acid and its conversion to imide occur under a wide range of reaction conditions, particularly, reaction temperature and duration. Temperature is usually the dominant factor. Below a certain temperature (about 100° C.) the amic acid will not convert to the imide without the aid of a coreactant. Above a certain temperature (about 175° C.) an amic acid, once formed, will begin conversion to the imide immediately. Very short reaction times, like those obtainable in a melt blender or extruder can yield mixtures of both amic acid and imide. At intermediate temperatures the reaction duration becomes important and mixtures of amic acid and imide result, the amount of each formed depends upon the duration.

Although only a single hydrazido substituted antioxidant stabilizer is usually reacted with the described anhydride polymers or copolymers, multiple hydrazido substituted stabilizers of the same class may be reacted by first blending the additives together before addition to such polymers under reactive conditions. Alternatively, multiple reactive additives of the same class may be added individually in a sequential fashion under reactive conditions. It has been found that the least reactive stabilizers can be advantageously added first and the more reactive ones later in the preparation. The number of stabilizers and the quantities of each is, however, limited by the amount of anhydride available in the particular polymer or copolymer. That is, the total stoichiometric equivalents of all added stabilizer hydrazides may not exceed the equivalents of anhydride in the polymer or copolymer.

The reaction of the hydrazido substituted additives with anhydride polymers or copolymers may be carried out in inert solvents such as benzene, toluene, xylene, mesitylene, tetrahydronaphthalene, chlorobenzene, dimethylformamide, tetrahydrofuran and aliphatic hydrocarbons. In some cases the reaction may stop at the intermediate amic acid or partial conversion of the amic acid to the imide may occur. The amic acids cyclize to the desired imides at higher temperatures.

Preferably, the reactive stabilizers are attached to the anhydride polymers or copolymers by a melt blending step in the absence of a solvent. This can be accomplished at a temperature above the softening point of the anhydride polymer or copolymer using any conventional melt mixing apparatus such as a plastograph, Banbury mixer, two roll mill, single or twin screw extruder or any other method which applies sufficient heat (e.g., 175° to 275° C.) and shear to the ingredients to obtain a satisfactory blend. Preferably, the reaction should be carried out in an inert atmosphere such as nitrogen.

The reaction can be carried out on anhydride polymers or copolymers (either in solution or in the molten stage) alone or in a blend with an inert polymer or copolymer such as polystyrene, rubber-modified polystyrene (HIPS), ABS, MBS, SAN, ASA, etc.

The reaction is to be carried out for times varying from 30 seconds to 48 hours depending upon the desired degree of conversion of the anhydride, the reactivity of the reactive stabilizer, the reaction temperature, and the presence or absence of a solvent or catalyst. The temperature range includes from 20° C. to the decomposition temperature of either starting material. For many polymers this decomposition temperature is between 230° adn 260° C. However, for engineering thermoplastics such as poly(phenylene oxide) or polycarbonate, decomposition temperatures easily exceed 300° C. At lower reaction temperatures, the reactive antioxidant stabilizers used for the invention become attached to the polymers as amic acid derivatives. For solution reactions, temperatures are conveniently controlled by judicious choice of solvents within an appropriate boiling range. Temperatures in this case range from 20° C. to approximately 225° C., preferably, from 75° C. to 200° C. and, most preferably from 110° C. to 200° C. Reaction times for solvent reaction range from several minutes to 48 hours. Higher reaction temperatures will reduce time for coversion to the desired product(s). Preferably, solvent reaction times will be between 15 minutes and 8 hours and, most preferably between 15 minutes and 1 hour. In addition, azeotropic water removal from the solvent will facilitate most solvent reactions.

Appropriate temperatures for melt processing the reactive components can range from 20° C. to greater than 300° C. in the case for engineering thermoplastics. Generally, the preferred range is from the softening temperature of the starting polymer to about 300° C. Most preferably, the temperature range will be from 150° C. to 300° C. The time required at the higher temperatures of melt processing are preferably from 30 seconds to 8 hours and most preferably from 30 seconds to about 1 hour.

As reaction temperatures are increased, as in the case of engineering thermoplastics, the amic acids initially formed tend to cyclize to imides. Imide formation in most cases is assured by temperatures exceeding 225° C.

It is within the scope of this invention that the anhydride polymers or copolymers may be partially imidized with ammonia, primary alkyl or aromatic amines and the residual anhydride groups either totally or partially reacted with the reactive stabilizers to form imide groups. Likewise the anhydride polymers or copolymers may be reacted with the reactive stabilizer groups first and then the residual anhydride groups either totally or partially reacted with ammonia, primary alkyl or aromatic amines or the anhydride copolymers may be reacted simultaneously with the reactive stabilizers and the primary amines. A particularly preferred embodiment is to partially imidize the anhydride copolymer with a $C_8$ to $C_{200}$ primary alkyl amine or mono amine-terminated poly(oxyalkylene). Small amounts of monoamine-terminated Jeffamines (primary amine terminated block copolymers of ethylene oxide and propylene oxide, products of Texaco Chemical Company) will contribute advantageous mold release properties to the polymers or copolymers. These $C_8$ to $C_{200}$ alkyl or poly(oxyalkylene) substituents will also lower the Tg of the modified copolymers, increase their compatibility with other polymeric compositions such as polyolefins, lower processing temperatures, increase melt flow and may also contribute to lubricating properties.

Residual carboxyl or anhydride groups may be reacted with aqueous bases or metallic oxides to form ammonium or metal salts along the polymer. Care must be taken to avoid saponification of the stabilizer groups.

It is also within the scope of this invention that the anhydride polymers or copolymers may be partially imidized with other functionalized amines or hydrazides which will add additional properties to the polymers or copolymers as, for example, attachment of trialkoxysilylalkylamines such as aminomethyltrimethoxysilane, 3-aminopropyltriethoxysilane or 3-aminopropyltri(n-propyloxy)silane (see U.S. Pat. 3,755,354). Alkoxysilane groups enhance the ability of the polymer or copolymer system to accept fillers. Likewise, reaction of chlorinated or brominated primary amines or hydrazides will contribute flame retardant properties to the polymers or copolymers. Antistatic properties can be introduced in a similar manner. For example, the anhydride copolymers may be partially reacted with 3-(dimethylamino)propylamine to form the 3-(dimethylamino)propylimide and then in a subsequent step the dimethylaminopropyl group may be quaternized with an alkyl halide such as methyl iodide (see U.S. Pat. 3,555,001).

When the attachments are run in solution, the products can be isolated by removal of the solvent or by precipitation of the product in a non-solvent and dried in an oven at elevated temperature, preferably, under vacuum or an inert atmosphere.

When the attachments are carried out in a mixer in the molten state, the blended product is cooled, ground up in a grinder and dried in an oven at elevated temperatures, preferably, under vacuum or an inert atmosphere. When the reaction is carried out in an extruder, the extrudate is cooled, either by an inert gas or by a cooling bath, dried if necessary, pelletized or ground up and, if necessary, redried in an oven.

The polymer bound stabilizers of this invention can be used by themselves as stabilized compositions or they may be blended with other polymers to form stabilized blends. When blending with other polymers, it is advantageous to try to match the polymer backbone of the anhydride containing copolymer with the polymer or copolymer to be stabilized. For example, better results are obtained when stabilizing polypropylene if the stabilizer (G) groups are attached to an octadecene-maleic anhydride copolymer rather than a styrene-maleic anhydride copolymer. Likewise, the styrene-maleic anhydride copolymers are more suitable for attachment of the G groups when stabilizing styrenics.

Concentrates of the polymer bound stabilizers in other polymers can be used as masterbatches to stabilize other polymer systems. For example, masterbatches of modified Dylark TM resins in polystyrene may be blended with poly(phenylene oxide)-polystyrene blends to stabilize them against thermal degradation. The amount of concentrate required will depend on the stabilizer groups attached, their concentration in the concentrate, additional additives present, the particular polymer system to be stabilized, and the degree of stabilization desired. Optimization of these variables are easily accomplished.

In general, about 0.01 to 5% by weight of the active stabilizer group (i.e., the G group) is needed in the final polymer or copolymer blend. A preferred range is from about 0.05 to about 2% by weight, and a more preferred range is about 0.1 to about 1% by weight of active stabilizer group.

The compositions of this invention may be blended together or used in combination to take advantage of the various modes of protection afforded by the different antioxidant classes. In this regard, synergistic mixtures offer particular advantage. Examples of synergistic blends include (a) hindered phenols and sulfides, and (b) hindered phenols and secondary aromatic amines.

The polymer bound stabilizers of this invention can be used together with auxiliary additives to further enhance the properties of the finished polymer. Economic benefits will be realized by the addition of auxiliary additives that can act as synergists with the polymer bound stabilizer groups. Polymer bound hindered phenol groups, for example, are known synergists with sulfides, aromatic secondary amines and 2-hydroxybenzophenones. Examples of auxiliary additives that can be used in conjunction with the stabilizers of this invention include: other antioxidants such as alkylated monophenols, alkylated hydroquinones, hydroxylated thiodiphenyl ethers, alkylidene-bis-phenols, hindered phenolic benzyl compounds, acylaminophenols, esters of 2-(3,5- di-t-butyl-4-hydroxy-phenyl)propionic acid, esters of 2-(5-t-butyl-4-hydroxy-3-methylphenyl)propionic acid, 2-(3,5-di-t-butyl-4-hydroxyphenyl)propionic acid amides, UV absorbers and light stabilizers such as 2-(2'-hydroxyphenyl)-2H-benzotriazoles, 2-hydroxybenzophenones, benzylidene malonate esters, esters of substituted or unsubstituted benzoic acids, diphenyl acrylates, nickel chelates, oxalic acid diamides, hindered amine light stabilizers, metal deactivators, phosphites and phosphonites, peroxide decomposers, fillers and reinforcing agents, plasticizers, lubricants, corrosion and rust inhibitors, emulsifiers, mold release agents, pigments, carbon black, fluorescent brightners, both organic and inorganic flame retardants and non-dripping agents, melt flow improvers and antistatic agents.

The modified polymer or copolymer of this invention may be used as a stabilizer concentrate, and may be blended with other polymers or copolymers to provide stabilization thereto, when higher levels of stabilizers are attached to the anhydride. Examples of such polymers and copolymers which may be stabilized by these stabilizer concentrates include:

1. Polyolefins such as high, low, and linear low density polyethylenes, which may be optionally crosslinked, polypropylene, polyisobutylene, poly(methylbutene-1), polyacetylene and in general polyolefins derived from monomers having from two to about ten carbons and mixtures thereof.
2. Polyolefins derived from diolefins such as polybutadiene and polyisoprene.
3. Copolymers of mono or diolefins such as ethylene-propylene, propylene-butene-1, propylene-isobutylene, and ethylene-butene-1 copolymer.
4. Terpolymers of ethylene and propylene with dienes (EPDM) such as butadiene, hexadiene, dicyclopentadiene and ethylidene norbornene.
5. Copolymers of alpha-olefins with acrylic acid or methacrylic acids or their derivatives such as ethylene-acrylic acid, ethylene-methacrylic acid and ethylene-ethyl acrylate copolymers.
6. Styrenic polymers such as polystyrene (PS) and poly(p-methylstyrene).
7. Styrenic copolymers and terpolymers such as styrene-butadiene (SBR), styrene-allyl alcohol and styrene-acrylonitrile (SAN), styrene-acrylonitrile-methacrylate terpolymer, styrene-butadiene-styrene block copolymers (SBS), rubber modified styrenics such as styrene-acrylonitrile copolymers modified with acrylic ester polymer (ASA), graft copolymers of styrene on rubbers such as polybutadiene (HIPS), polyisoprene or styrene-butadiene-styrene block copolymers (Stereon TM products available from Firestone Synthetic Rubber and Latex Co.), graft copolymers of styrene-acrylonitrile on rubbers such as butadiene (ABS), polyisoprene or styrene-butadiene-styrene block copolymers, graft copolymers of styrene-methyl methacrylate on rubbers such as polybutadiene (MBS), butadiene-styrene radial block copolymers (e.g., KRO 3 of Phillips Petroleum Co.), selectively hydrogenated butadiene-styrene block copolymers (e.g., Kraton G from Shell Chemical Co.) and mixtures thereof.
8. Polymers and copolymers derived from halogen-containing vinyl monomers such as poly(vinyl chloride), poly(vinyl fluoride), poly(vinylidene chloride), Poly(vinylidene fluoride), poly(tetrafluoroethylene) (PTFE), vinyl chloride-vinyl acetate copolymers, vinylidene chloride-vinyl acetate copolymers and ethylene-tetrafluoroethylene copolymers.
9. Halogenated rubbers such as chlorinated and/or brominated butyl rubbers or polyolefins and fluoroelastomers.
10. Polymers and copolymers derived from alpha, beta-unsaturated acids, anhydrides, esters, amides, and nitriles or combinations thereof such as polymers or copolymers of acrylic and methacrylic acids, alkyl and/or glycidyl acrylates and methacrylates, acrylamide and methacrylamide, acrylonitrile, maleic anhydride, maleimide, the various anhydride containing polymers and copolymers described in this disclosure, copolymers of the above polymers and various blends and mixtures thereof as well as rubber modified versions of the above polymers and copolymers.
11. Polymers and copolymers derived from unsaturated alcohols or their acylated derivatives such as poly(vinyl alcohol), poly(vinyl acetate), poly(vinyl stearate), poly(vinyl benzoate), poly(vinyl maleate), poly(vinyl butyral), poly(allyl phthalate), poly(allyl diethylene glycol carbonate) (ADC), ethylene-vinyl acetate copolymer and ethylene-vinyl alcohol copolymers.
12. Polymers and copolymers derived from unsaturated amines such as poly(allyl melamine).
13. Polymers and copolymers derived from epoxides such as polyethylene oxide polypropylene oxide and copolymers thereof as well as polymers derived from bis-glycidyl ethers.
14. Poly(phenylene oxides), poly(phenylene ethers) and modifications thereof containing grafted polystyrene or rubbers as well as their various blends with polystyrene, rubber modified polystyrenes or nylon.
15. Polycarbonates and especially the aromatic polycarbonates such as those derived from phosgene and bisphenols such as bisphenol-A, tetrabromobisphenol-A and tetramethylbisphenol-A.
16. Polyester derived from dicarboxylic acids and diols and/or hydroxycarboxylic acids or their corresponding lactones such as polyalkylene phthalates (e.g., polyethylene terephthalete (PET), polybutylene terephthalate (PBT), and poly(1,4-dimethylcyclohexane terephthalate) or copolymers thereof) and polylactones such as polycaprolactone.
17. Polyarylates derived from bisphenols (e.g., bisphenol A) and various aromatic acids such as isophthalic and terephthalic acids or mixtures thereof.
18. Aromatic copolyestercarbonates having carbonate as well as ester linkages present in the backbone of the polymers such as those derived from bisphenols, iso- and terephthaloyl chlorides and phosgene.
19. Polyurethanes and polyureas.
20. Polyacetals such as polyoxymethylenes and polyoxymethylenes which contain ethylene oxide as a comonomer.
21. Polysulfones, polyethersulfones and polyimidesulfones.
22. Polyamides and copolyamides which are derived from diamines and dicarboxylic acids and/or from aminocarboxylic acids or the corresponding lactones such as the following nylons: 6,6/6, 6/10, 11 and 12

23. Polyimides, polyetherimides, polyamideimides and copolyetheresters.
24. Crosslinked polymers which are derived from aldehydes on the one hand and from phenols, ureas and melamine on the other hand such as phenol-formaldehyde, urea-formaldehyde and melamine-formaldehyde resins.
25. Alkyl resins such as glycerol-phthalic acid resins and mixtures thereof with melamine-formaldehyde resins.
26. Blends of vinyl monomers and unsaturated polyester resins which are derived from copolyesters of saturated and unsaturated dicarboxylic acids with polyhydric alcohols as well as from vinyl compounds (crosslinking agents) and also halogen-containing, flame resistant modifications thereof.
27. Natural polymers such as cellulose, natural rubber as well as the chemically modified homologous derivatives therof such as cellulose acetates, cellulose propionate, cellulose butyrate and the cellulose ethers such as methyl and ethyl cellulose.

In addition, the polymer bound stabilizers of this invention may be used to stabilize various combinations or blends of the above polymers or copolymers. They are particularly useful in the stabilization of polyolefins, acrylic coatings, styrenics, rubber modified styrenics, poly(phenylene oxides) and their various blends with styrenics, rubber-modified styrenics or nylon.

EXAMPLES

The following reactive additives were used in the preparation of the polymer bound stabilizers in the examples:

A. beta-(3,5-di-t-butyl-4-hydroxyphenyl)propionhydrazide (MW=292)
B. beta-(n-hexylmercapto)propionhydrazide (MW=204.3)
C. 3,5-di-t-butyl-hydroxybenzhydrazide (MW=265)
D. S-(2-benzothiazoyl)thioglycolic acid hydrazide (MW=239.3)
E. S-(2-benzimidazolyl)thioglycolic acid hydrazide (MW=222)
F. S-(3,5-di-t-butyl-4-hydroxybenzyl)thioglycolic acid hydrazide (MW=324)
G. Jeffamine TM M-360 (Texaco Chemical Co.) Reactive stabilizers C, D, and E were prepared by the hydrazinolysis of the corresponding methyl or ethyl esters. Reactive stabilizers A and B were prepared by the hydrazinolysis of the corresponding pentaerythritol tetraesters (Irganox 1010, a product of the Ciba-Geigy Corp and Mark 2140, a product of Witco Chemical Corp). Stabilizer F was prepared by the reaction of 3,5-di-t-butyl-4-hydroxybenzyl chloride with the sodium salt of thioglycolic acid hydrazide.

The following maleic anhydride copolymers were used in the preparation of the polymer bound antioxidant stabilizers in the examples:

Cadon 127 resin is a commercial styrene-maleic anhydride polymer alloy with ABS and was obtained from the Monsanto Chemical Co.

PA-18 is a copolymer of 1-octadecene and maleic anhydride and was obtained from Chevron Chemical Co. It has a molecular weight of about 50,000.

SMA TM is a low molecular weight alternating copolymer of styrene and maleic anhydride with number average molecular weight of approximately 1600.

Gantrez AN 169 is a methyl vinyl ether-maleic anhydride copolymer commercially available from GAF.

The Dylark TM resins are high molecular weight non-equimolar copolymers of styrene and maleic anhydride commercially available from Arco Chemical Company. Dylark TM 240 and 250 are rubber modified while Dylark TM 232 is not. Dylark TM 250 is prepared by polymerizing about 92% by weight styrene monomer and about 8% by weight maleic anhydride, in the presence of about 18 parts by weight Stereon TM Rubber 720 (Firestone Synthetic Rubber and Latex Co.) per 100 parts of combined styrene and maleic anhydride.

Ricon 184/MA is a polybutadiene-polystyrene-maleic anhydride terpolymer and is a product of Colorado Chemical Specialties, Inc.

EXAMPLES 1-20

Attachment of Reactive Antioxidant Stabilizers to Maleic Anhydride Copolymers in Solution The polymeric stabilizer examples (Table I) were typically prepared by placing a specified quantity of maleic anhydride copolymer into an appropriate flask equipped with a Dean-Stark assembly and magnetic stirrer. Sufficient xylene was added to effect solution or permit adequate stirring of a suspension. The mixture was refluxed about 30 minutes followed by cooling to below 90° C. for the addition of reactive stabilizer. Reflux was resumed for 0.5 hr to 5.0 hr depending on the reactivity of the additives. The reaction was monitored by water volume in the Dean-Stark trap and by periodic sampling of the reaction mixture for infrared analysis. The conversion of the anhydride carbonyl absorption at about 1780 cm$^{-1}$ to the imide carbonyl absorption of about 1730-1735 cm$^{-1}$ indicated the extent of reaction. Workup consisted of (1) Insoluble polymer was filtered, washed with hexane to remove residual xylene and air dried; (2) Soluble polymer-reaction mixture was poured into a tray, the solvent allowed to evaporate for up to 7 days and then scraped off the tray; (3) Soluble product was precipitated by adding the reaction mixture to an agitated volume of a non solvent (such as methanol or hexane), filtering and air drying.

TABLE I

| EX # | RESIN (Tg° C.) | STABILIZER | WT RATIO* | ISOLATION METHOD | PRODUCT Tg° C. | IR (Vc = o) |
|---|---|---|---|---|---|---|
| 1 | CADON 127 (130.1) | A | .43 | 2 | 151.8/107.4 | 1735 cm$^{-1}$ |
| 2 | CADON 127 | B | .31 | 2 | 94.6 | 1730 |
| 3 | CADON 127 | D | .36 | 2 | 140.2/106.8 | 1730 |
| 4 | GANTREZ AN169 (157.9) | A | 1.52 | 1 | 169.1 | 1732 |
| 5 | GANTREZ AN169 | B | 1.09 | 1 | 152.9 | 1735 |
| 6 | GANTREZ AN169 | D | 1.26 | 1 | 151.1 | 1730 |
| 7 | PA-18 90.5) | A | .67 | 2 | 100.5 | 1730 |
| 8 | PA-18 | B | .55 | 2 | 111.9 | 1730 |

TABLE I-continued

| EX # | RESIN (Tg° C.) | STABI-LIZER | WT RATIO* | ISOLATION METHOD | PRODUCT Tg° C. | IR (Vc = o) |
|---|---|---|---|---|---|---|
| 9 | PA-18 | D | .55 | 2 | 91.5 | 1730 |
| 10 | DYLARK 232 (118.6) | D | .18 | 3 | 114.5 | 1735 |
| 11 | DYLARK 232 | E | .18 | 3 | 131.3 | 1735 |
| 12 | DYLARK 232 | F | .26 | 2 | 107.0 | 1735 |
| 13 | DYLARK 240 (119.5) | A | .28 | 3 | 116.3 | 1733 |
| 14 | DYLARK 250 (120.2) | C | .24 | 3 | 152.3 | 1735 |
| 15 | DYLARK 250 | B | .16 | 3 | 97.5 | 1734 |
| 16 | RICON 184 MA | A | .14 | 2 | (LIQUID) | 1735 |
| 17 | RICON 184 MA | B | .10 | 2 | (LIQUID) | 1735 |
| 18 | RICON 184 MA | D | .12 | 2 | (LIQUID) | 1735 |
| 19 | DYLARK 232 | A | .14 | 2 | 87.8 | 1735 |
|   |   | G | .12 |   |   |   |
| 20 | SMA 1000 (147.0) | A | 1.11 | 3 | 163.0 | 1733 |

*Ratio of stabilizer to resin in the preparation

EXAMPLES 21-23

Attachment of Reactive Antioxidant Stabilizers to Maleic Anhydride copolymers by Melt Processing The blending compartment of a C. W. Brabender prep mixer was heated to approximately 200° C. Pelletized resin was added in portions until a homogeneous melt was obtained. To the mixing resin was then added the reactive stabilizer in small portions over a one minute period. The blend was mixed an additional five minutes at 200° C., after which time the resin was removed from the mixer, cooled to room temperature and pelletized in a grinder. (See Examples, Table II)

TABLE II

| EX # | RESIN (Tg° C.) | STABILIZER | WT RATIO* | PRODUCT Tg° C. | IR(Vc = o) |
|---|---|---|---|---|---|
| 21 | CADOM 127 (130.1) | A | .0585 | 124.3 | 1732 |
| 22 | CADOM 127 | F | .0650 | 125.0 | 1731 |
| 23 | SMA 1000 | C | 1.2000 | 180.1 | 1735 |

*Ratio of stabilizer to resin in the melt

EXAMPLE 24

The stabilizer of example 20 was melt blended into polypropylene (PRO-FAX TM 6501, Himont Inc.) at the 1 phr level using a small (1¼") lab extruder at a temperature of 200° C. The composition obtained was tested for thermooxidative stability using a Perkin Elmer Series 7 DSC at 170° C. Induction time was measured from the time oxygen was introduced until onset of degradation (exotherm). The results showed an induction time of 48.0 minutes for the stabilized material compared to only 4.6 minutes for unstabilized polypropylene.

EXAMPLE 25

To illustrate the extraction resistance of the polymeric antioxidants of the present invention, the stabilizer of Example 20 was compounded into polypropylene (Pro-Fax TM 6501) at the 2% level using a Brabender Prep Mixer. The resulting composition was injection molded into 2"×3"×⅛" plaques which were subsequently extracted with n-heptane for 2 hours at 65° C. Concentrating the extract allowed analysis by liquid chromatography. As a comparison, Irganox 1076 (octadecyl 3-(3,5-di-t-butyl-4-hydroxyphenyl)propionate, a commercial antioxidant from Ciba-Geigy) was similarly compounded, molded and extracted. The Irganox 1076 was used at the 1% level to equalize the hindered phenol content between the blended compositions.

For the Irganox 1076, 4.3% of the originally added stabilizer was extracted from the composition. For the polymeric stabilizer of Example 20, the amount extracted was less than the detection limit for the UV detector on the liquid chromatograph, i.e., less than 0.003%.

EXAMPLE 26

The blending compartment of a CW Brabender prep mixer was heated to approximately 200° C. The granulated stabilizer of Example 21 (44.34 g) was premixed with 200.66 g of granular Cadon 127 resin by shaking (manually) in a closed container. The granulated blend was then added in portions to the heated mixer. Five to ten minutes was required for the melt to become homgeneous and reach 200° C. The mass was now mixed an additional five minutes, after which time the resin was removed from the apparatus, separated into smaller pieces and allowed to cool to room temperature before being granulated in a grinder. The product resin prepared by this masterbatch dilution contains approximately a 1% level of phenolic antioxidant based on the initial level of stabilizer A added to prepare the masterbatch stabilizer of Example 21. The composition obtained was now tested for thermooxidative stability using a Perkin Elmer Series 7 DSC at 200° C. Induction time was measured from the time oxygen was introduced until the time where the exotherm reached a maximum. The results showed an induction time of 36 minutes for the stabilized composition compared to only 12 minutes for the Cadon 127 control.

EXAMPLE 27

In the manner of Example 26, the stabilizer of Example 22 (40.16 g) was diluted to the 1% antioxidant level by blending in 204.84 g of Cadon 127 resin. Thermoxidative stability results showed an induction time of 47 minutes for the stabilized composition compared to only 12 minutes for the Cadon 127 control.

What is claimed:

1. A polymer with recurring units selected from the formulas

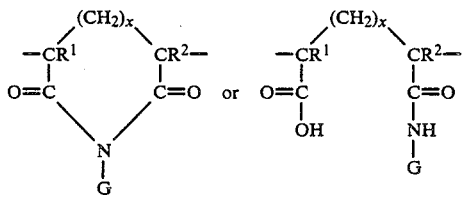

or both in which the units occur either in the polymer backbone, on grafted side chains, as pendant units, or combinations thereof and wherein x is 0 or 1, $R^1$ and $R^2$ are independently selected from hydrogen, alkyl of 1-6 carbons, cycloalkyl or 5-7 carbons, phenyl, chlorine or bromine, and each

is the residue of a hydrazido substituted stabilizer group selected from (a) hindered phenols, (b) dialkyl sulfides, (c) secondary aromatic amines, and (d) benzothiazoles or benzimidazoles, with the proviso that only one class of antioxidant stabilizer selected from (a) through (d) are attached to the polymer but multiple combinations of stabilizers within the same class are permitted.

2. The composition of claim 1 in which group (a) is

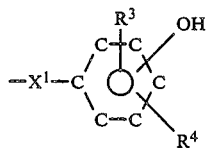

wherein $R^3$ is t-alkyl of 4-8 carbons, and $R^4$ is selected from hydrogen, alkyl of 1-8 carbons including t-alkyl of 4-8 carbons and alkoxy of 1-8 carbons, $X^1$ is a divalent radical selected from —N(R)—C(=O)—(CH$_2$)$_b$—C(=O)—NH—, —N(R)—C(=O)—(CH$_2$)$_b$—, —N(R)—C(=O)—(CH$_2$)$_b$—S—CH$_2$—, —N(R)—C(=O)—(CH$_2$)$_b$—O—(CH$_2$)$_b$—, —N(R)—C(=O)—(CH$_2$)$_b$—Z—, and —N(R)—C(=O)—C(CH$_3$)$_2$— in which b is 0, 1 or 2, and Z is selected from —NH—, —S—, or —O—, R is hydrogen, primary or secondary alkyl of 1-8 carbons, aralkyl of 7-12 carbons or cycloalkyl of 5-12 carbons.

3. The composition of claim 2 in which the hydroxy group is in the 4 position, $R^3$ and $R^4$ are independently selected from t-butyl and t-amyl groups, and at least one of the t-alkyl groups is ortho to the hydroxy group, and $X^1$ is —N(R)—C(=O)—(CH$_2$)$_b$—C(=O)—NH—, —N(R)—C(=O)—(CH$_2$)$_b$—, —N(R)—C(=O)—(CH$_2$)$_b$—S—CH$_2$— or —N(R)—C(=O)—(CH$_2$)$_b$—Z—, where R is hydrogen, and Z is —NH—.

4. The composition of claim 1 in which group (b) is —N(R)—C(=O)—(CH$_2$)$_z$—S—R$^5$ wherein $R^5$ is aralkyl of 7-12 carbons, alkyl of 1-18 carbons, dialkylaminoalkyl of 3-12 carbons, z is 1 or 2, and R is hydrogen, primary or secondary alkyl of 1-8 carbons, aralkyl of 7-12 carbons or cycloalkyl of 5-12 carbons.

5. The composition of claim 4 in which R is hydrogen, $R^5$ is an alkyl of 6-18 carbons, benzyl or dimethylaminoethyl, and z is 2.

6. The composition of claim 1 in which group (c) is

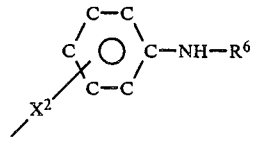

where $R^6$ is aryl of 6-14 carbons, alkyl of 1-12 carbons or cycloalkyl of 5-12 carbons, $X^2$ is a divalent radical selected from —N(R)—C(=O)—(CH$_2$)$_b$—C(=O)—NH— and —N(R)—C(=O)—(CH$_2$)$_b$—NH—, R is hydrogen, primary or secondary alkyl of 1-8 carbons, aralkyl of 7-12 carbons or cycloalkyl of 5-12 carbons and b is 0, 1 or 2.

7. The composition of claim 6 in which $R^6$ is aryl of 6-10 carbons or alkyl of 1-12 carbons, $X^2$ is —N(R)—C(=O)—(CH$_2$)$_b$—C(=O)—NH—, and R is hydrogen.

8. The composition of claim 1 in which group (d) is

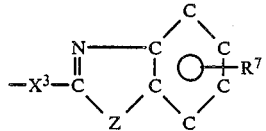

in which $R^7$ is hydrogen or alkyl of 1-4 carbons, $X^3$ is a divalent radical selected from —N(R)—C(=O)—(CH$_2$)$_z$—Z—, —N(R)—C(=O)—(CH$_2$)$_b$—C(=O)—NH—, —N(R)—C(=O)—(CH$_2$)$_b$—NH— and —N(R)—C(=O)—NH—, R is hydrogen, primary or secondary alkyl of 1-8 carbons, aralkyl of 7-12 carbons or cycloalkyl of 5-12 carbons, b is 0, 1 or 2 and z is 1 or 2.

9. The composition of claim 8 in which R is hydrogen, $X^3$ is —N(R)—C(=O)—(CH$_2$)$_z$—Z— where Z is —S— or —NH—.

10. A polymer composition comprising a synthetic polymer which is subject to thermal, oxidative, or actinic light degradation and an effective amount for stabilization of the composition of claim 1.

11. The composition of claim 10 wherein the synthetic polymer or copolymer is selected from styrenic polymer or copolymer optionally rubber modified, polyolefin, polyphenylene ether, polyamides, and mixtures thereof.

* * * * *